US007844059B2

(12) United States Patent
Tashev et al.

(10) Patent No.: US 7,844,059 B2
(45) Date of Patent: Nov. 30, 2010

(54) DEREVERBERATION OF MULTI-CHANNEL AUDIO STREAMS

(75) Inventors: Ivan Tashev, Kirkland, WA (US); Daniel Allred, Douglasville, GA (US)

(73) Assignee: Microsoft Corporation, Redmond, WA (US)

( * ) Notice: Subject to any disclaimer, the term of this patent is extended or adjusted under 35 U.S.C. 154(b) by 1383 days.

(21) Appl. No.: 11/166,967

(22) Filed: Jun. 24, 2005

(65) Prior Publication Data

US 2006/0210089 A1 Sep. 21, 2006

Related U.S. Application Data

(60) Provisional application No. 60/663,480, filed on Mar. 16, 2005.

(51) Int. Cl.
*H04B 3/20* (2006.01)

(52) U.S. Cl. ....................... 381/66; 381/94.3; 381/94.1; 379/406.14

(58) Field of Classification Search ................... 381/66, 381/63, 71.1, 98, 71.14, 94.1, 94.2, 94.3; 700/94; 375/285, 254, 346; 704/226, 233
See application file for complete search history.

(56) References Cited

U.S. PATENT DOCUMENTS

| | | | | |
|---|---|---|---|---|
| 3,542,954 | A * | 11/1970 | Flanagan | 381/66 |
| 4,087,633 | A * | 5/1978 | Fitzwilliam | 381/66 |
| 4,131,760 | A | 12/1978 | Christensen et al. | |
| 5,761,318 | A * | 6/1998 | Shimauchi et al. | 381/66 |
| 5,774,562 | A * | 6/1998 | Furuya et al. | 381/66 |
| 6,363,345 | B1 * | 3/2002 | Marash et al. | 704/226 |
| 6,377,637 | B1 * | 4/2002 | Berdugo | 375/346 |
| 6,459,914 | B1 * | 10/2002 | Gustafsson et al. | 455/570 |
| 6,507,623 | B1 | 1/2003 | Gustafsson et al. | |
| 7,054,451 | B2 * | 5/2006 | Janse et al. | 381/83 |
| 2003/0023436 | A1 | 1/2003 | Eide | |
| 2004/0190730 | A1 | 9/2004 | Rui et al. | |
| 2004/0198296 | A1 | 10/2004 | Hui et al. | |
| 2006/0115095 | A1 * | 6/2006 | Giesbrecht et al. | 381/66 |

FOREIGN PATENT DOCUMENTS

| | | | |
|---|---|---|---|
| EP | 1511358 | A2 | 3/2005 |
| WO | WO2004/077407 | | 9/2004 |

OTHER PUBLICATIONS

H. Attias, J. C. Platt, A. Acero, L. Deng, *Speech Denoising and Dereverberation Using Probabilistic Models, in* Advances in Neural Information Processing Systems 13 (Sebastian Thrun et al., MIT Press, 2001).

(Continued)

*Primary Examiner*—Xu Mei
*Assistant Examiner*—Jason R Kurr
(74) *Attorney, Agent, or Firm*—Lyon & Harr, LLP; Richard T. Lyon

(57) ABSTRACT

A system and process for dereverberation of multi-channel audio streams is presented which uses reverberation suppression techniques. In general, the present system and process builds a frequency dependent model of the reverberation decay and uses spectral subtraction-based reverberation reduction to achieve the aforementioned suppression. This dereverberation system and process can be used to improve automatic speech recognition (ASR) results with minimal CPU overhead.

19 Claims, 7 Drawing Sheets

OTHER PUBLICATIONS

Bees, D., M. Blostein, P. Kabal, Reverberant speech enhancement using cepstral processing, *Proc. IEEE Int'l Conf. Acoustics, Speech, Signal Processing*, 1991, vol. 1, pp. 977-980.

Clear Voice Capture One Microphone Solution for Automatic Speech Recognition, (visited Jul. 5, 2005) <hhttp://www.claritycvc.com/clarity/upload/pdf/omsasr_general.pdf>.

Couvreur, L., S. Dupont, C. Ris, J.-M. Boite, C. Couvreur, Fast adaptation for robust speech recognition in reverberant environments, *Adaptation*, 2001, pp. 85-88.

Gelbart, D. and N. Morgan, Double the trouble: Handling noise and reverberation in far-field automatic speech recognition, *Proc. IEEE Int'l Conf. Acoustics, Speech, Signal Processing*, 2003, vol. 1, pp. 844-847.

Gillespie, B., D. A. Florêncio, and H. S. Malvar, Speech dereverberation via maximum-kurtosis subband adaptive filtering, *Proc. IEEE Int'l Conf. Acoustics, Speech, and Signal Processing*, May 2001, vol. 6, pp. 3701-3704.

Giuliani, D., M. Omologo, and P. Svaizer, Experiments of speech recognition in noisy and reverberant environment using a microphone array and HMM adaptation, *Proc. of the Int'l Conf. on Spoken Language Processing*, Philadelphia, Pennsylvania, Oct. 1996, vol. 3, pp. 1329-1332.

Liu, J., and H. Malvar, Blind deconvolution of reverberated speech signals via regularization, *Proc. IEEE Int'l Conf. Acoustics, Speech, Signal Processing*, May 7-11 2001, vol. 5, pp. 3037-3040.

Mourjopoulos, J., and J. K. Hammond, Modelling and enhancement of reverberant speech using an envelope convolution method, *Proc. IEEE Int'l Conf. Acoustics, Speech, Signal Processing*, 1983, Boston, MA, pp. 1144-1147.

Petropulu, A., S. Subramaniam, and C. Wendt, Cepstrum-based deconvolution for speech dereverberation, *IEEE Trans. on Speech and Audio Processing*, Sep. 1996, vol. 4, No. 5, pp. 392-396.

Philsoft V3: An ASR engine originating from the telecom world, (visited Jul. 5, 2005) <http://www.telisma.com/iso_album/philsoft_september2003.pdf >.

Michael L. Seltzer, Microphone Array Processing for Robust Speech Recognition, Ph.D Thesis, Carnegie Mellon University, Jul. 2003.

Sohn, J., N. S. Kim, W. Sung, A statistical model-based voice activity detection, *IEEE Signal Processing Letters*, Jan. 1999, vol. 6, No. 1, pp. 1-3.

Wu, W., and D. Wang, A one-microphone algorithm for reverberant speech enhancement, *Proc. IEEE Int'l Conf. Acoustics, Speech, and Signal Processing*, 2003, vol. 1, pp. 844-847.

* cited by examiner

DEREVERBERATION OF MULTI-CHANNEL AUDIO STREAMS

CROSS-REFERENCE TO RELATED APPLICATIONS

This application claims the benefit of a previously-filed provisional patent application Ser. No. 60/663,480 filed on Mar. 16, 2005.

BACKGROUND

Background Art

Efficient and accurate sound capturing is required for real-time communication scenarios (such as messenger programs, VoIP telephony, and groupware) and speech recognition (such as voice commands and dictation). However one problem with capturing "clean" sound is that together with the speech signal, the microphone also acquires ambient noises and reverberations. Humans have great ability to remove these distracting influences when present in the same room. The brain uses the information from both ears and adapts to different room response functions. However, if sound is recorded with a mono microphone in one room and the signal is transferred to another room, the brain cannot remove the reverberation. This reduces the intelligibility of the playback and leads to a poor listening experience.

Studies also show that the presence of reverberation in a room seriously reduces the effectiveness of automatic speech recognition (ASR) engines. The need to improve the speech recognition results by presenting clean sound input has fostered huge amounts of research into the areas of noise suppression, microphone array processing, acoustic echo cancellation and methods for reducing the effects of acoustic reverberation.

Reducing reverberation through deconvolution (inverse filtering) is one of the most common approaches. The main problem is that the channel must be known or very well estimated for successful deconvolution. The estimation is done in the cepstral domain or on envelope levels. Multi-channel variants use the redundancy of the channel signals and frequently work in the cepstral domain.

Blind dereverberation methods seek to estimate the input (s) to the system without explicitly computing a deconvolution or inverse filter. Most of them employ probabilistic and statistically based models.

Dereverberation via suppression and enhancement is similar to noise suppression. These algorithms either try to suppress the reverberation, enhance the direct-path speech, or both. There is no channel estimation and there is no signal estimation, either. Usual techniques are long-term cepstral mean subtraction, pitch enhancement, and LPC analysis, in single or multi-channel implementation.

Unfortunately, the foregoing methods have problems. The most common issues are slow reaction when reverberation changes, poor robustness to noise, and excessive computational requirements.

SUMMARY

The present invention is directed toward a system and process for dereverberation of multi-channel audio streams of the type that employs suppression techniques. In general, the present system and process builds a frequency dependent model of the reverberation decay and uses spectral subtraction-based reverberation reduction. This initially involves estimating the reverberation decay parameters for each audio channel being captured. More particularly, the reverberation time $RT_{60}$ of the room where the audio is being captured is computed first. Then, for each channel, the next portion of the audio stream that exhibits reverberation but no speech components for a period greater than the estimated $RT_{60}$ is identified. For each of a prescribed number of frequency sub-bands, the energy exhibited in a particular number of the frames of the audio stream being analyzed in the aforementioned reverberation period is measured for the frequency sub-band under consideration. The number of frames is equal to the estimated $RT_{60}$ divided by the duration of the frames. Next, for each frame whose energy has been measured and which was captured after a prescribed number of the aforementioned frames, an energy equation is established. The resulting system of energy equations is then solved to establish values for a reverberation energy factor, the noise floor energy and a decay time constant. In addition, the reverberation-to-signal ratio (RSR) is computed. Once all the sub-bands have been considered, there will be a decay time constant and RSR value established for each sub-band.

The next phase of the multi-channel dereverberation process involves suppressing the reverberation component of each frame of the captured audio stream that it is desired to "clean-up". In one embodiment of the present system and process this involves first computing an adaptation time constant. Next, for each of the aforementioned sub-bands, a momentary decay time constant for the frame currently under consideration is estimated. Likewise, a momentary RSR parameter for the current frame is estimated. A reverberation reduction factor for the frame under consideration is computed based in part on the signal-to-reverberation ratio (SRR) and can then be smoothed if desired. This smoothed factor varies between 0 and 1, and controls the amount reverberation suppression imposed.

The reverberation energy for each frequency of interest in the speech application that is using the present multi-channel dereverberation system and process is computed next. More particularly, for each frequency of interest, a decay time constant associated with the current frame under consideration is computed by linearly interpolating between the previously-computed values of the momentary decay time constant for the frequency sub-bands closest to the frequency of interest under consideration. Similarly, a RSR parameter associated with the current frame is computed for the frequency under consideration by linearly interpolating between the previously-computed values of the momentary RSR parameter for the frequency sub-bands closest to the selected frequency. A reverberation energy value is then computed for the frame under consideration at the frequency under consideration. The reverberation energy and reverberation reduction factor established for the current frame and the frequency under consideration are then used to suppress the reverberation component in the current frame. When all the frequencies of interest have been considered, the suppression is complete for the frame under consideration and the foregoing procedure is repeated for each subsequent frame in which it is desired to suppress the reverberation component.

The foregoing reverberation suppression technique includes innovations never before employed in this type of audio processing. A few examples include measuring the reverberation model parameters after the end of a word with a pause longer than $RT_{60}$ to ensure there are no speech components in the signal that could skew the results. In addition, interpolating using an exponentially decaying function with an accounting for the noise floor is believed to be new. Further, adjusting the adaptation time constant based on parameter variation and adjusting the reverberation reduction based on SRR are believed to be unique.

The foregoing dereverberation system and process can be used to improve automatic speech recognition (ASR) results with minimal CPU overhead. For example, in tested embodiments, the present system and process was found to reduce word error rates (WER) up to one half of the way between those of a microphone array only and a close-talk microphone. Further, it was found that a four channel implementation required less than 2% of the CPU power of a modern computer on an ongoing basis.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 The Computing Environment

Figure 1:
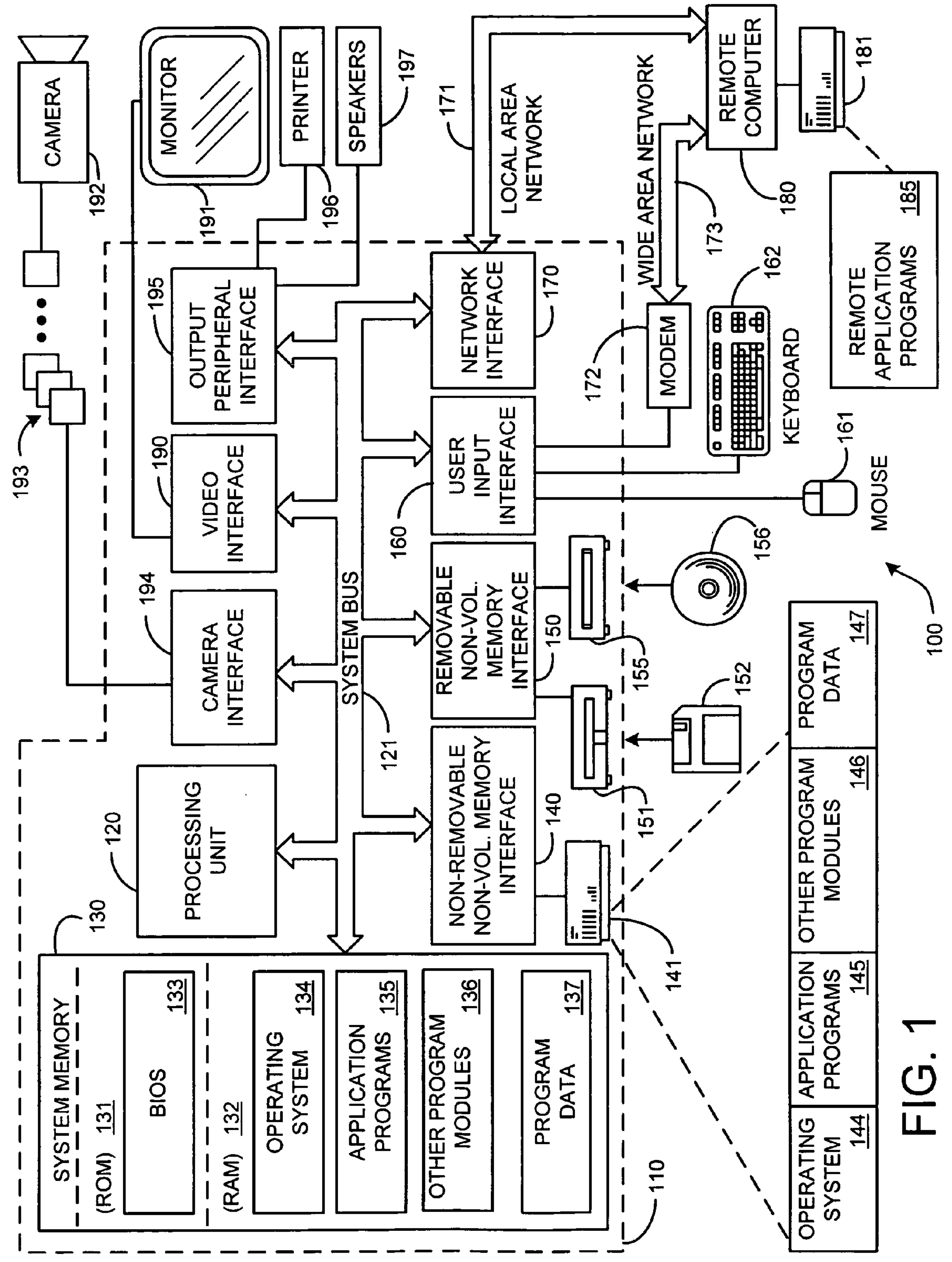
FIG. 1 is a diagram depicting a general purpose computing device constituting an exemplary system for implementing the present invention.

Before providing a description of the preferred embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Multi-Channel Dereverberation

Figure 6:
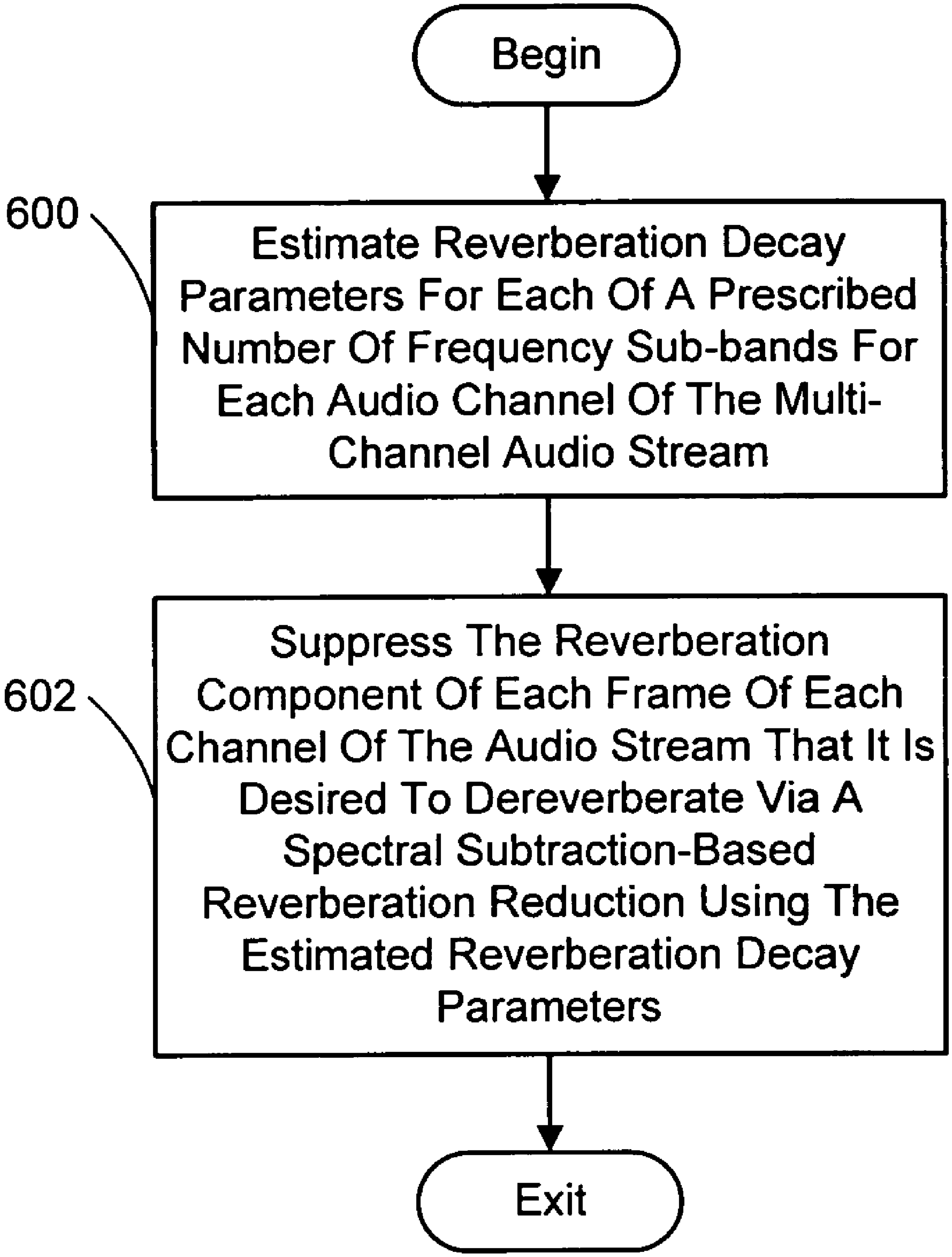
FIG. 6 is a flow chart diagramming an overall process according to the present invention for the dereverberation of a multi-channel audio stream.

The present invention is directed toward a system and process for dereverberation of multi-channel audio streams of the type that employs reverberation suppression techniques. In general, a frequency dependent model of the reverberation decay is built and spectral subtraction-based reverberation reduction is employed to accomplish the task. More particularly, as outlined in FIG. 6, the dereverberation of a multi-channel audio stream is accomplished by first estimating reverberation decay parameters for each of a prescribed number of frequency sub-bands for each audio channel of the multi-channel audio stream assuming a frequency dependent model of the reverberation decay (process action 600). Then, the reverberation component of each frame of each channel of the audio stream that it is desired to dereverberate is suppressed via a spectral subtraction-based reverberation reduction using the estimated reverberation decay parameters (process action 602). The following sections describe the system and process in more detail.

2.1 Modeling and Assumptions

Figure 2:
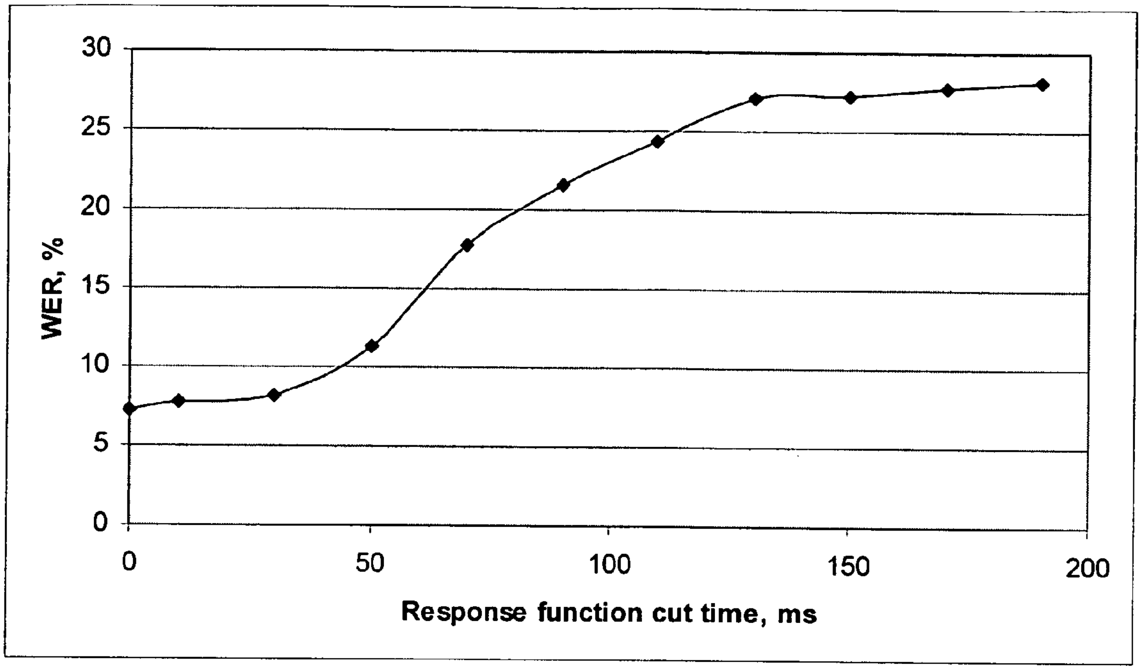
FIG. 2 is a graph plotting the word error rate (WER) percentage against the response function cut time in milliseconds for a typical automatic speech recognition (ASR) engine.
Figure 3:
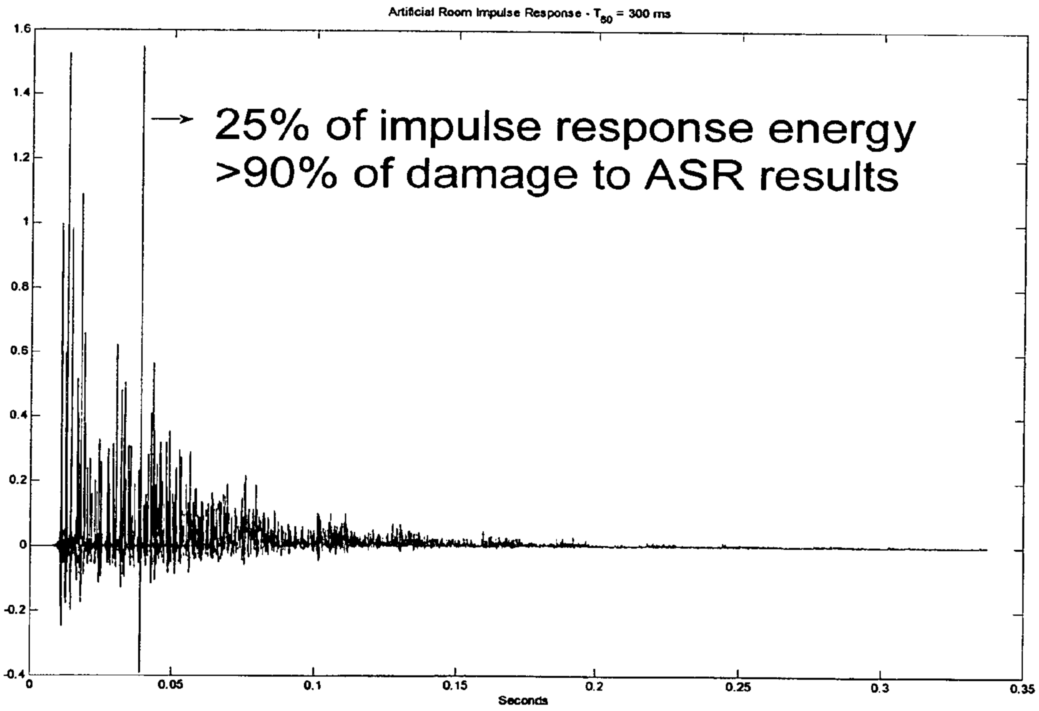
FIG. 3 is a graph of a typical room impulse response showing it is the last 25% of the impulse response energy which cause 90% of the damage to ASR results.

In experimentation to characterize the effects of reverberation on an ASR engine, a "clean" speech signal was convolved with a typical room response function and processed through the engine. The length of the response function was cut after some point. The results are shown on FIG. 2. As can be seen, the early reverberation practically has no effect on the ASR results. This is probably due to cepstral mean subtraction (CMS) in the front end of the ASR engine. The CMS compensates for the constant part of the input channel response and removes the early reverberation. However, it was found that the last 25% of the impulse response energy caused 90% of the damage to ASR results, as shown in FIG. 3. The reverberation has noticeable effect on the word error rate (WER) between 50 ms and $RT_{60}$. In this time interval the reverberation behaves like non-stationary, uncorrelated decaying noise colored with the spectrum of the speech signal. Thus:

$$Y(f)=X(f)+\Re(f) \quad (1)$$

where Y(f) is the overall signal captured by a microphone at frequency f, X(f) is speaker component of the overall signal at frequency f and $\Re(f)$ is the uncorrelated decaying noise that includes the aforementioned reverberation at frequency f.

It is assumed that the reverberation energy in this time interval decays exponentially and is the same in every point of the room (i.e., it is diffuse). Given this, the present decay model is frequency dependent, i.e., $$\begin{aligned} S_{\Re_n}(f) &= \sum_{i=0}^{n-N} \alpha(f) S_{X_i}(f) \exp\left(-\frac{iT}{\tau(f)}\right) \\ &= \alpha(f) S_{Y_{n-N}}(f) \exp\left(-\frac{NT}{\tau(f)}\right), \end{aligned} \quad (2)$$

where n is the current frame number, $S_{\Re_n}(f)$ is the reverberation energy of the n-th frame at frequency f, N is the number of frames where it is not desired to suppress the reverberation (~50 ms/T), α(f) is the momentary reverberation-to-signal-ratio (RSR), $S_{X_i}(f)$ is the energy of the speaker component of the overall signal for the n-th frame at frequency f, T is the frame duration, τ(f) is the decay time constant, and $S_{Y_{n-N}}(f)$ is the energy measured for a previous frame captured N frames back from the current frame at frequency f.

2.2 Model Parameters Estimation

Estimation of the two decay parameters per frequency bin (α and τ) would consume too much CPU time and would need a longer time to converge. Therefore the decay ratio and time constant are estimated in L frequency sub-bands. In tested embodiments, the sub-bands were separated by cosine-shaped, 50% overlapping weight windows with logarithmically increasing width towards the higher frequencies. The parameter estimation happens when there is a pure reverberation process—namely after the end of the word and only if the pause to the next word is longer than the estimated reverberation time $RT_{60}$. A Gaussian probabilistic based speech/non-speech classifier can be used to determine the pause length. Conventional methods are used to estimate $RT_{60}$. Essentially, these methods consider the volume of the room and the sound absorption characteristics of the surfaces in the room (e.g., walls, floor, ceiling, and objects present therein) to establish a reverberation time. Traditionally, this is expressed in terms of the time required for the sound level to decrease by 60 dB, and hence is abbreviated as $RT_{60}$. Alternately, it is also possible to employ a maximal realistic value of $RT_{60}$ instead of estimating a specific value for the space. A typical conference room, for example, would have a maximal realistic $RT_{60}$ value of approximately 300 ms.

The energy in each sub-band for the last $K=RT_{60}/T$ frames is recorded and interpolated using:

$$S(k)=A\cdot\exp(-kT/\tilde{\tau})+B, k\in[N,K] \quad (3)$$

The unknowns are A, B and $\tilde{\tau}$. Because (K−N)>3, an over-determined non-linear system of equations results. In tested embodiments, this system of equations was solved using a mathematical minimization technique with minimum mean square error as the criterion. Here B is the noise floor, $\tilde{\tau}$ is a decay time constant and the RSR parameter is computed as $\tilde{\alpha}=A/S_{Y_{n-N}}$. It is noted that for a $RT_{60}$ value of approximately 300 ms and a frame duration of 20 ms, the number of frames K recorded would be 15.

One way of reflecting the estimated momentary parameters τ(f) and α(f) in the decay model is to use values computed for the frame (n) under consideration as follows:

$$\tau_n(l) = \tau_{n-1}(l) + \frac{T}{\tau_A}[\tilde{\tau}_n(l) - \tau_{n-1}(l)]$$
$$\alpha_n(l) = \alpha_{n-1}(l) + \frac{T}{\tau_A}[\tilde{\alpha}_n(l) - \alpha_{n-1}(l)] \quad (4)$$

where $\tau_A$ is the adaptation time constant and l is the frequency sub-band. Note that for the first frame under consideration in tested embodiments, $\tau_{n-1}(l)=\tau_0(l)=\tilde{\tau}$ and $\alpha_{n-1}(l)=\alpha_0(l)=\tilde{\alpha}$. However, empirically derived values or even a value of zero could be used instead. It is also noted the values of the decay model parameters for all frequencies (f) are computed using linear interpolation between the L estimated points, where in operation the frequencies (f) are those frequencies of interest in the application employing the present dereverberation system and process (e.g., like an ASR engine).

2.3 Reverberation Reduction

Based on the assumption that the reverberation in the time interval of interest already behaves as non-correlated noise, spectral subtraction is used for optimal, in the sense of minimum mean square error, reverberation reduction:

$$\tilde{X}_n(f) = \begin{cases} \frac{S_{Y_n}(f) - \beta S_{\Re_n}(f)}{S_{Y_n}(f)} Y_n(f) & \text{for } S_{Y_n}(f) > S_{\Re_n}(f) \\ (1-\beta)Y_n(f) & \text{otherwise} \end{cases} \quad (5)$$

where $\tilde{X}(f)$ is the reverberation suppressed signal at frequency f, $S_Y(f)$ is the energy of the overall signal, and β∈[0,1] is the reduction parameter used to adjust the suppressed portion of the reverberation. Here $S_\Re(f)$ is estimated according to (2) and when β=1, a classic spectral subtraction filter results.

2.4 Adaptation and Reduction Control

The proposed algorithm has two adjustable controls: the adaptation time constant $\tau_A$ in Eq. (4) for updating the reverberation model and the reduction parameter β from Eq. (5) for adjusting the amount of reverberation it is desired to reduce.

The choice of the time constant $\tau_A$ depends on how fast it is desired to adapt when the reverberation changes. If the speaker comes close to the microphone this causes a decrease in the momentary reverberation-to-signal-ratio (RSR). On the other hand, the presence of noise will make the reverberation model parameters vary more. Thus, adjusting the time constant depends on the reverberation-to-noise-ratio (RNR) and the signal-to-noise ratio (SNR). Both affect the variation of measured reverberation parameters. In tested embodiments, the time constant is constrained between $\tau_{AMIN}$ and $\tau_{AMAX}$ as follows:

$$\tau_A = \begin{vmatrix} \tau_{AMAX} & \text{when } \mu\sigma_R^2 T > \tau_{AMAX} \\ \mu\sigma_R^2 T & \\ \tau_{AMIN} & \text{when } \mu\sigma_R^2 T < \tau_{AMAX} \end{vmatrix}. \quad (6)$$

Here $\sigma_R^2$ is the variance of the relative RSR and is a measure of how much the reverberation model varies. One way of computing this variance is to compute it for each new frame under consideration as follows:

$$\sigma_{R_n}^2 = \left(1 - \frac{T}{2\tau_{AMAX}}\right)\sigma_{R_{n-1}}^2 + \frac{T}{2L\tau_{AMAX}} \sum_{l=0}^{L-1} \left( \frac{(\tilde{\alpha}_n(l) - \alpha_n(l))^2}{\alpha_n(l)^2} \right) \quad (7)$$

Note that the adaptation is accomplished with a time constant that is twice as big as $\tau_{AMAX}$. $\mu$ is an adjustment parameter designed to constrain the decay time constant to a desired variance $\sigma_R^2$, which can be determined empirically for the particular application involved. In tested embodiments $\mu$ was chosen to be practically the reciprocal value of the desired variance of the reverberation model. Usually $\tau_{AMIN}$ is at least twice the frame duration T and $\tau_{AMAX}$ is set to 5-10 seconds, i.e., wherever the adaptation process becomes so slow that is pointless for practical purposes. Also note that for the first frame considered, where $$\sigma_{R_{n-1}}^2 = \sigma_{R_0}^2, \sigma_{R_0}^2$$

can be set to an empirically determined value or to 0, as desired.

The reverberation reduction is a non-linear process and, as such, it can have a negative impact on ASR results when little reverberation is present. The reduction parameter $\beta$ is used to reduce this impact in low reverberation conditions where the reduction causes more damage than decrease in WER. In tested embodiments it was computed as:

$$\tilde{\beta}_n = \begin{vmatrix} 1 & \text{when } \lambda\overline{\alpha}_n - \chi > 1 \\ \lambda\overline{\alpha}_n - \chi & \\ 0 & \text{when } \lambda\overline{\alpha}_n - \chi < 0 \end{vmatrix} \quad (8)$$

where $$\overline{\alpha}_n = \frac{1}{L}\sum_{l=0}^{L-1} \alpha_n(l)$$

is the average momentary reverberation-to-signal-ratio, $\chi$ sets at which $\alpha$ the reduction starts, and $\lambda$ is used to control the $\alpha$ in cases where it is desired to have full reduction. The parameter $\chi$ is the average $\alpha$ across the sub-bands measured on a clean speech signal to reflect the fact that words have no ideal falling slope on the energy envelope. The value of $\lambda$ is set so that the dereverberation starts when the signal-to-reverberation ratio (SRR) is less than 30 dB (where SRR is equal to the inverse of the RSR). In tested embodiments, the 30 dB threshold was chosen because it was found that the reverberation energy was too low to significantly affect the accuracy of an ASR engine if the SRR was any higher.

The reduction parameter $\beta$ was also smoothed in tested embodiments as follows, with the same time constant as above:

$$\beta_n = \left(1 - \frac{T}{2\tau_{AMAX}}\right)\beta_{n-1} + \frac{T}{2\tau_{AMAX}}\tilde{\beta}_n. \quad (9)$$

Note that for the first frame considered where $\beta_{n-1}=\beta_0$, $\beta_0$ can be set to an empirically determined value or to 0, as desired.

The foregoing process is implemented as a microphone array preprocessor. The multi-channel implementation uses the same decay model for all channels, and the SRR is estimated separately for each channel.

2.4 Multi-Channel Dereverberation Process

Figure 4A:
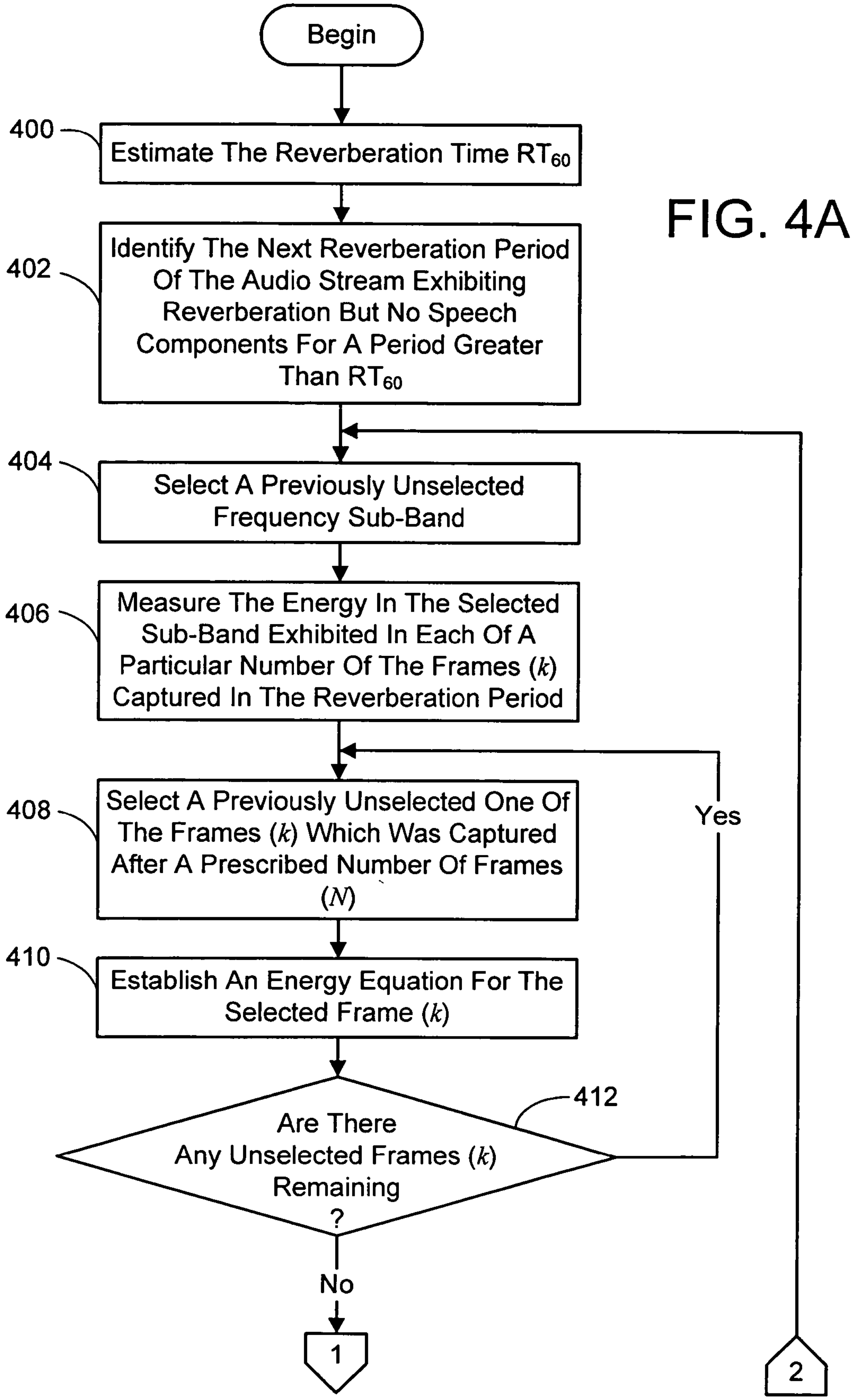
FIGS. 4A and 4B are a flow chart diagramming a process according to the present invention for estimating the reverberation decay parameters for each audio channel being captured.
Figure 4B:
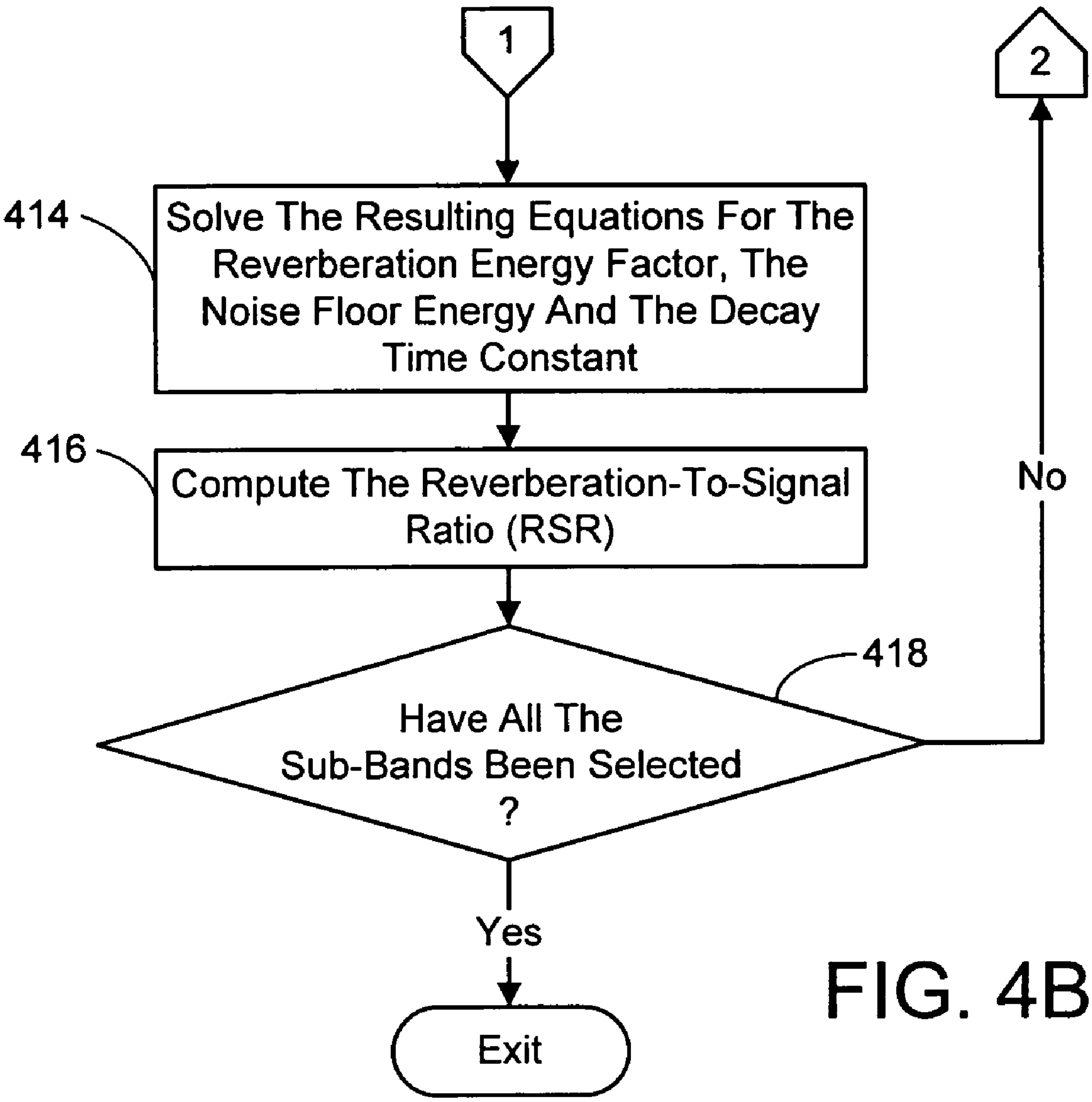

Given the foregoing, one implementation of a multi-channel dereverberation process is as follows. First, the reverberation decay parameters are estimated for each audio channel being captured, as outlined in the process flow diagram of FIGS. 4A and 4B. The exemplary process begins by estimating the reverberation time $RT_{60}$ of the room where the audio is being captured (process action 400). It is noted that the $RT_{60}$ estimate can be established once and used in the computations for each channel and all frequencies of interest in a human speech application.

The next step in the process is to identify the next portion of the audio stream being analyzed that exhibits reverberation but no speech components for a period greater than the estimated $RT_{60}$ (process action 402). A previously unselected frequency sub-band (l) is then selected (process action 404). A prescribed number (L) of these sub-bands (l) are established ahead of time. For example in tested embodiments, four sub-bands were established covering frequency ranges of 400-800, 800-1600, 1600-3200 and 3200-6400 Hz, respectively. The energy exhibited in a particular number of the frames (K) of the audio stream being analyzed in the aforementioned reverberation period and in the selected frequency sub-band is measured next (process action 406). The number of frames (K) employed is equal to the estimated $RT_{60}$ divided by the duration of the frames (T).

Next, a previously unselected one of the frames (k) whose energy has been measured and which was captured after a prescribed number (N) of the K frames, is selected in process action 408. The prescribed number of frames (N) corresponds to the earlier frames of the reverberation period which have been found to have only a minimal effect of speech applications (such as an ASR engine). An energy equation is then established for the selected frame (k) in process action 410. This energy equation takes the form of the previously-described Eq. (3). It is next determined if there are any previously unselected frames (k) remaining (process action 412). If there are, then process actions 408 through 412 are repeated until all the frames (k) have been processed. The result is a system of energy equations. In the next process action 414, these equations are solved using a mathematical minimization technique where the minimum mean square error is employed as the criterion, to establish values for the reverberated energy factor (A), the noise floor energy (B) and the decay time constant ($\tilde{\tau}$). The reverberation-to-signal ratio ($\tilde{\alpha}$) or RSR is also computed using the previously-described equation $\tilde{\alpha}=A/S_{Y_{n-N}}$, (process action 416).

The reverberation decay parameters estimation procedure continues by determining if all the frequency sub-bands (l) have been selected (process action 418). If not, process actions 404 through 418 are repeated until a RSR ($\tilde{\alpha}$) and decay time constant ($\tilde{\tau}$) have been established for each sub-band, at which point the process ends.

Figure 5A:
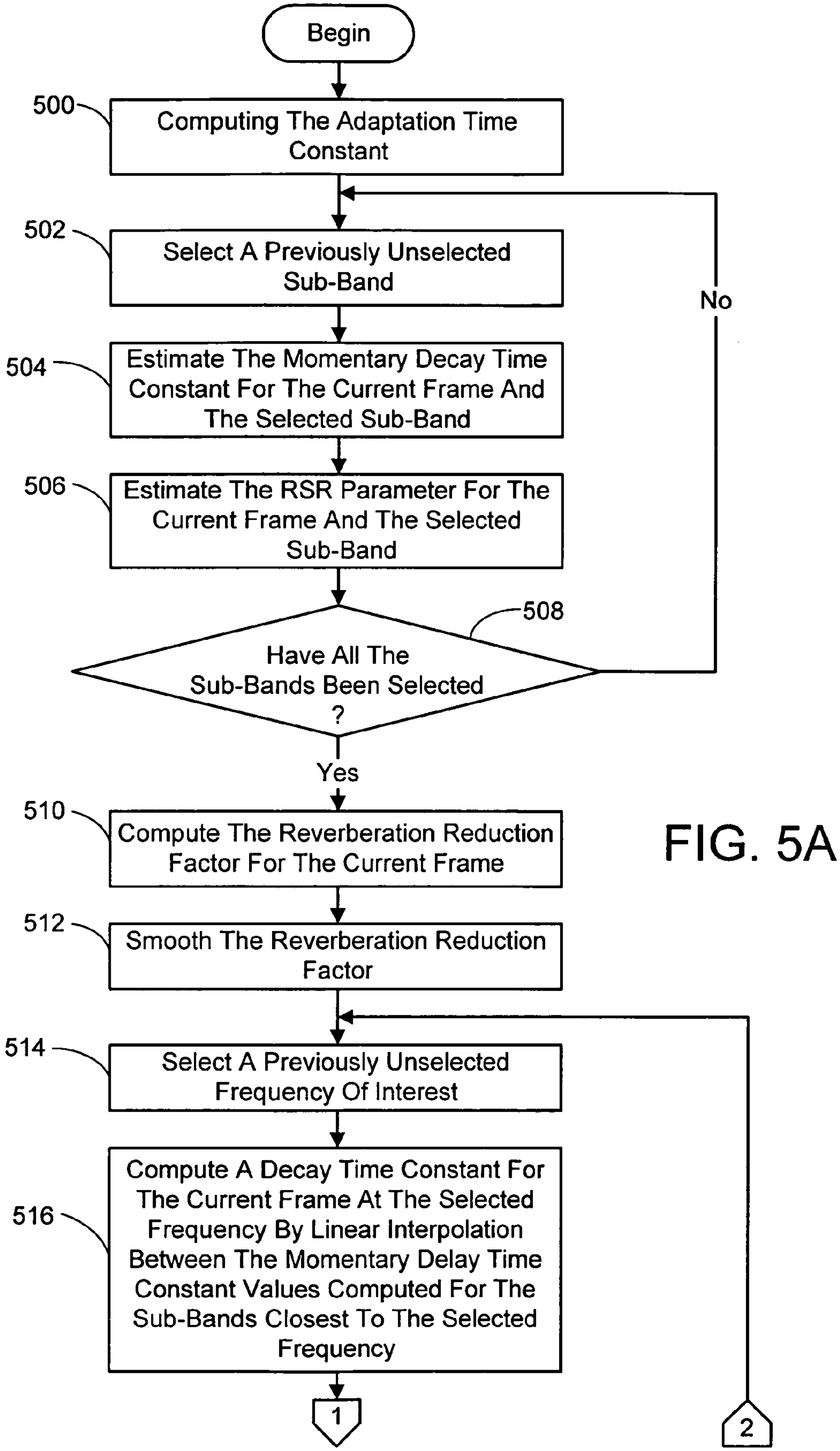
FIGS. 5A and 5B are a flow chart diagramming a process according to the present invention for suppressing the reverberation component of each frame of each captured audio stream.
Figure 5B:
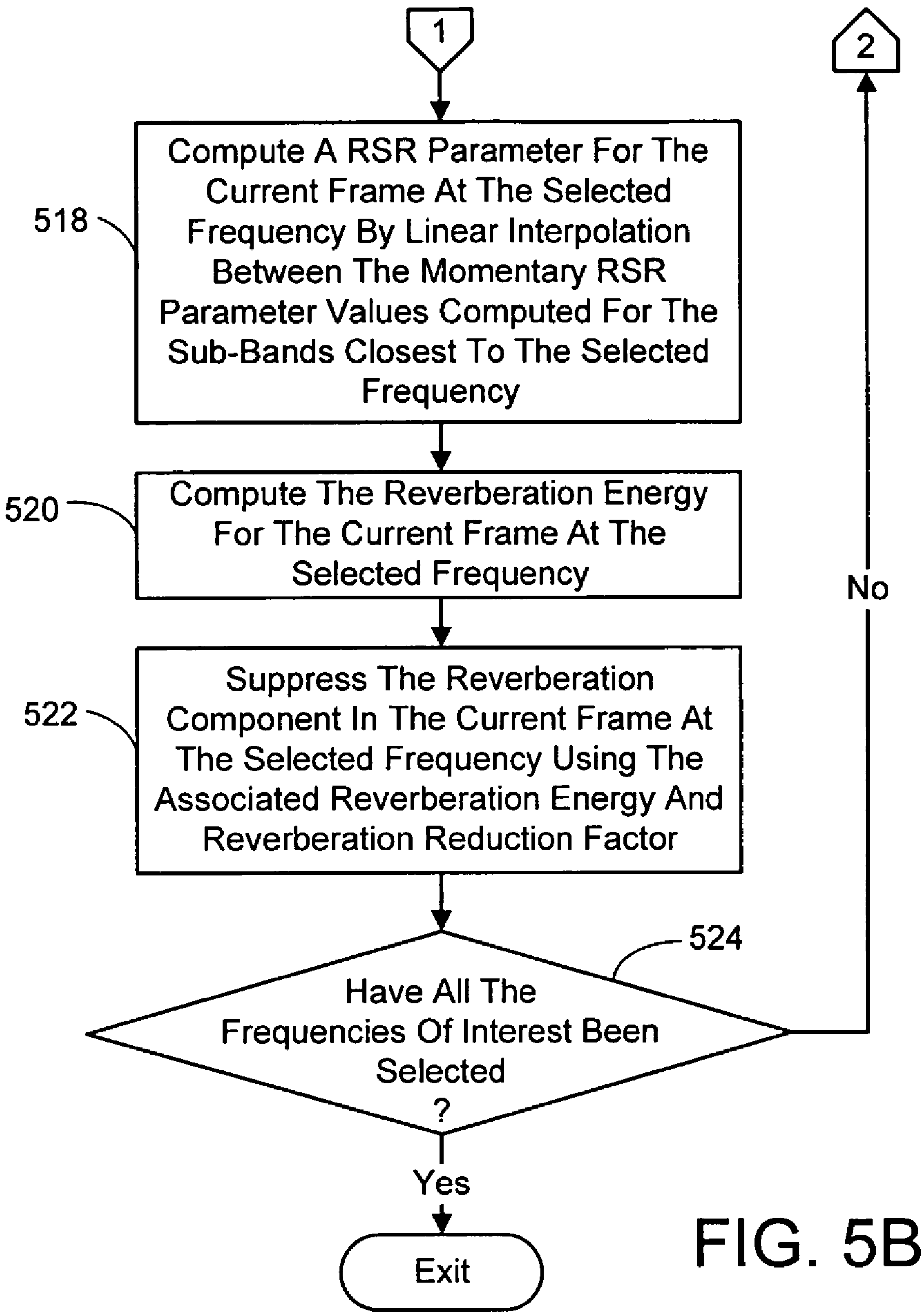

The next phase of this exemplary multi-channel dereverberation process involves suppressing the reverberation component of each frame of the captured audio stream that it is desired to "clean-up". Referring to FIGS. 5A and 5B, this first involves computing the adaptation time constant $\tau_A$ (process action 500). As indicated previously, this is done using Eq. (6). At this point in the procedure, a previously unselected one of the aforementioned sub-bands is selected (process action 502). The momentary decay time constant ($\tau_n$(l)) for the frame (n) currently under consideration and the selected sub-band (l) is then estimated using Eq. (4) in process action 504. Likewise, in process action 506, the RSR parameter ($\alpha_n$(l)) for the frame (n) currently under consideration and the selected sub-band (l) is estimated using Eq. (4). It is then determined if all the frequency sub-bands (l) have been selected (process action 508). If not, process actions 502 through 508 are repeated until a momentary decay time constant and RSR have been established for each sub-band.

Next, the reverberation reduction factor ($\tilde{\beta}_n$) for the frame under consideration is computed in process action 510, using Eq. (8). This factor is then smoothed in process action 512 using Eq. (9) to produce a smoothed reverberation reduction factor ($\beta_n$). This smoothed factor varies between 0 and 1, and controls the amount reverberation suppression imposed.

The process continues by computing the reverberation energy for each frequency of interest in the speech application that is using the present multi-channel dereverberation process. More particularly, a previously unselected frequency of interest is selected (process action 514). A decay time constant $\tau_n$(f) associated with the frame (n) under consideration is then computed for the selected frequency (f) by linearly interpolating between the previously-computed values of the momentary decay time constant for the frequency sub-bands closest to the selected frequency (process action 516). Similarly, a RSR parameter $\alpha_n$(l) associated with the frame (n) under consideration is then computed for the selected frequency (f) by linearly interpolating between the previously-computed values of the momentary RSR parameter for the frequency sub-bands closest to the selected frequency (process action 518). The reverberation energy $S_{\Re}(f)$ is then computed for the frame under consideration at the selected frequency in process action 520 using Eq. (2).

The previously-computed reverberation energy $S_{\Re}(f)$ and reverberation reduction factor ($\tilde{\beta}_n$) are used to suppress the reverberation component in the frame under consideration at the selected frequency in process action 522, using Eq. (5). It is then determined if all the frequencies of interest (f) have been selected (process action 524). If not, process actions 514 through 524 are repeated. When all the frequencies have been considered, the process ends.

The invention claimed is:

1. A computer-implemented process for dereverberation of a multi-channel audio stream, comprising:

using a computer to perform the following process actions:

estimating reverberation decay parameters for each of a prescribed number of frequency sub-bands for each audio channel of the multi-channel audio stream assuming a frequency dependent model of the reverberation decay, wherein the audio stream comprises a plurality of frames and said reverberation decay parameters comprise a decay time constant and a reverberation-to-signal ratio (RSR); and suppressing the reverberation component of each frame of each channel of the audio stream that it is desired to dereverberate via a spectral subtraction-based reverberation reduction using the estimated reverberation decay parameters.

2. The process of claim 1, wherein the process action of estimating the decay time constant parameter for each of the prescribed number of frequency sub-bands for each audio channel of the multi-channel audio stream, comprises the actions of:

estimating a reverberation time of a space where the audio associated with the audio stream is captured, said reverberation time being defined as the time required for sound levels to decrease by 60 dB;

for each audio channel, identifying the next portion of the audio stream associated with the channel under consideration that exhibits reverberation but no speech components for a period greater than the estimated reverberation time, designating the identified portion of the audio stream associated with the channel under consideration as a reverberation period, for each of the prescribed number of frequency sub-bands, measuring the energy exhibited in a prescribed number of the frames of the audio stream in the reverberation period for the frequency sub-band under consideration, establishing an energy equation for each frame of the audio stream in the reverberation period for the frequency sub-band under consideration, whose energy has been measured and which was captured after a second prescribed number of the frames in the reverberation period, to produce a system of energy equations, solving the system of energy equations to establish values for a reverberation energy factor, a noise floor energy and the decay time constant parameter for the frequency sub-band and channel under consideration.

3. The process of claim 2, wherein the process action of establishing an energy equation, comprises a process action of establishing the equation $S(k)=A\cdot\exp(-kT/\tilde{\tau})+B$ where S(k) is the energy of the frequency sub-band under consideration measured for frame k where k ranges between the first frame in the reverberation period following the initial number of frames in which it is not desired to suppress the reverberation and the total number of frames in the period which is equal to said reverberation time divided by a frame duration T, and where A is the unknown reverberation energy factor, B is the unknown noise floor energy, and $\tilde{\tau}$ is the unknown decay time constant parameter.

4. The process of claim 2, wherein the process action of estimating the RSR parameter for each of a prescribed number of frequency sub-bands for each audio channel of the multi-channel audio stream, comprises an action of, for each frequency sub-band and audio channel, computing the RSR as the reverberation energy factor divided by the energy measured for a frame of the audio stream in the reverberation period for the frequency sub-band and audio channel under consideration that was captured a third prescribed number of frames prior to the frame under consideration.

5. The process of claim 1, wherein the process action of suppressing the reverberation component of each frame of each channel of the audio stream that it is desired to dereverberate, comprises the actions of:

computing a reverberation reduction factor which controls the amount of reverberation suppression imposed;

computing a reverberation energy for each of a group of frequencies of interest; and suppressing the reverberation component for each frequency of interest using the reverberation reduction factor, and reverberation energy established for the frequency of interest under consideration.

6. The process of claim 5, wherein the process action of computing the reverberation reduction factor, comprises the actions of:

setting the reverberation factor to 1 whenever $\lambda\bar{\alpha}_n-\chi$ is greater than 1, wherein $\bar{\alpha}_n$ is the average momentary reverberation-to-signal ratio of the frame n under consideration, $\lambda$ is used to control the $\bar{\alpha}_n$ and is set so that the dereverberation starts when the signal-to-reverberation ratio (SRR) is less than a prescribed dB level wherein SRR is equal to the inverse of the RSR, and $\chi$ is used to set the value of $\bar{\alpha}_n$ at which the reverberation reduction starts and is defined as the average momentary reverberation-to-signal ratio across said frequency sub-bands measured on a clean speech signal;

setting the reverberation factor to 0 whenever $\lambda\bar{\alpha}_n-\chi$ is less than 0; and setting the reverberation factor to $\lambda\bar{\alpha}_n-\chi$ whenever $\lambda\bar{\alpha}_n-\chi$ falls in a range from 0 to 1.

7. The process of claim 6, wherein the average momentary reverberation-to-signal ratio is computed as $$\bar{\alpha}_n = \frac{1}{L}\sum_{l=0}^{L-1}\alpha_n(l),$$

where L is the total number of said frequency sub-bands, l is the frequency sub-band under consideration, and $\alpha_n(l)$ is the momentary reverberation-to-signal ratio of the frame n under consideration for the frequency sub-band under consideration.

8. The process of claim 6, wherein the process action of computing the reverberation reduction factor further comprises an action of smoothing the reverberation reduction factor prior to suppressing the reverberation components.

9. The process of claim 8, wherein the process action of smoothing the reverberation reduction factor comprises computing the smoothed reverberation reduction factor as $$\beta_n = \left(1 - \frac{T}{2\tau_{AMAX}}\right)\beta_{n-1} + \frac{T}{2\tau_{AMAX}}\tilde{\beta}_n,$$

where $\beta_n$ is the smoothed reverberation reduction factor of the frame under consideration, $\beta_{n-1}$ is the smoothed reverberation reduction factor of the frame immediately preceding the frame under consideration, $\tilde{\beta}_n$ is the reverberation reduction factor computed for the frame under consideration, T is the frame duration, and $\tau_{AMAX}$ is a prescribed maximum value of an adaptation time constant $\tau_A$.

10. The process of claim 9, wherein the process action of smoothing the reverberation reduction factor further comprises initially computing the adaptation time constant, said computation comprising the actions of:

setting the adaptation time constant equal to the prescribed maximum value whenever $\mu\sigma_R^2T$ is greater than said maximum adaptation time constant value, wherein $\mu$ is an adjustment parameter designed to constrain the decay time constant to a desired deviation of the relative RSR $\sigma_R^2$;

setting the adaptation time constant equal to a prescribed minimum value whenever $\mu\sigma_R^2T$ is less than said minimum adaptation time constant value; and setting the adaptation time constant equal to $\mu\sigma_R^2T$ whenever $\mu\sigma_R^2T$ falls in a range from the minimum adaptation time constant value to the maximum adaptation time constant value.

11. The process of claim 10, wherein the desired deviation of the relative RSR for the frame under consideration $\sigma_{R_n}^2$ is defined as $$\sigma_{R_n}^2 = \left(1 - \frac{T}{2\tau_{AMAX}}\right)\sigma_{R_{n-1}}^2 + \frac{T}{2L\tau_{AMAX}}\sum_{l=0}^{L-1}\left(\frac{(\tilde{\alpha}_n(l)-\alpha_n(l))^2}{\alpha_n(l)^2}\right),$$

where $\sigma_{R_{n-1}}^2$ is the desired deviation of the relative RSR for the frame immediately preceding the frame under consideration, L is the total number of said frequency sub-bands, l is the frequency sub-band under consideration, $\tilde{\alpha}_n(l)$ is said RSR parameter for the frame under consideration at frequency sub-band under consideration, and $\alpha_n(l)$ is the momentary reverberation-to-signal ratio of the frame under consideration for the frequency sub-band under consideration.

12. The process of claim 8, wherein the process action of suppressing the reverberation component for each frequency of interest, comprises the actions of:

setting the reverberation suppressed signal for the frame under consideration at the frequency of interest under consideration to be the product of the signal associated with the frame under consideration at the frequency of interest under consideration and $$\frac{S_{Y_n}(f) - \beta S_{R_n}(f)}{S_{Y_n}(f)},$$

whenever $S_{Y_n}(f)>S_{R_n}(f)$, where $S_{Y_n}(f)$ is the energy of the signal for the frame n under consideration and the frequency of interest f under consideration, $\beta$ is the smoothed reverberation reduction factor of the frame under consideration, $S_{R_n}(f)$ is the reverberation energy of the frame n under consideration and the frequency of interest f under consideration; and setting the reverberation suppressed signal for the frame under consideration at the frequency of interest under consideration to be the product of the signal associated with the frame under consideration at the frequency of interest under consideration and $(1-\beta)$ whenever $S_{Y_n}(f)$ is not greater then $S_{R_n}(f)$.

13. The process of claim 5, wherein the process action of computing the reverberation energy for each of a group of frequencies of interest, comprises, for each frame at each frequency of interest, the actions of:

for each of the frequency sub-bands, estimating a momentary decay time constant, and estimating a momentary RSR parameter;

computing a decay time constant associated with the frame under consideration by linearly interpolating between the previously-computed values of the momentary decay time constant for the frequency sub-bands closest to the frequency of interest under consideration;

computing a RSR parameter associated with the frame under consideration by linearly interpolating between the previously-computed values of the momentary RSR parameter for the frequency sub-bands closest to the frequency of interest under consideration; and computing the reverberation energy for the frame under consideration as $$S_{R_n}(f) = \alpha(f) S_{Y_{n-N}}(f) e^{-\frac{NT}{\tau(f)}},$$

wherein $S_{R_n}(f)$ is the reverberation energy of the frame n under consideration and the frequency of interest f under consideration, $\alpha(f)$ is the estimated momentary RSR parameter of the frame under consideration at the frequency of interest under consideration, $\tau(f)$ is the estimated momentary decay time constant of the frame under consideration at the frequency of interest under consideration, T is the frame duration, N is the number of frames in a prescribed reverberation period for which it is not desired to suppress the reverberation, and $S_{Y_{n-N}}(f)$ is the energy measured for a previous frame captured N frames back from the frame under consideration at the frequency of interest under consideration.

14. The process of claim 13, wherein the process action of estimating the momentary decay time constant for each frame at each frequency sub-band, comprises the actions of:

computing an adaptation time constant which controls how fast the reverberation decay parameters are allowed to change in response to reverberation changes; and estimating the momentary decay time constant for the frame under consideration at the frequency sub-band under consideration as $$\tau_n(l) = \tau_{n-1}(l) + \frac{T}{\tau_A}[\tilde{\tau}_n(l) - \tau_{n-1}(l)],$$

wherein $\tau_n(l)$ is the momentary decay time constant for the frame under consideration n at frequency sub-band under consideration l, $\tau_{n-1}(l)$ is the momentary decay time constant for the frame immediately preceding the frame under consideration at frequency sub-band under consideration, $\tau_A$ is the adaptation time constant, and $\tilde{\tau}_n(l)$ is said decay time constant for the frame under consideration at frequency sub-band under consideration.

15. The process of claim 14, wherein the process action of estimating the momentary RSR parameter for each frame at each frequency sub-band, comprises an action of estimating the momentary decay time constant for the frame under consideration at the frequency sub-band under consideration as $$\alpha_n(l) = \alpha_{n-1}(l) + \frac{T}{\tau_A}[\tilde{\alpha}_n(l) - \alpha_{n-1}(l)],$$

wherein $\alpha_n(l)$ is the momentary RSR parameter for the frame under consideration n at frequency sub-band under consideration l, $\alpha_{n-1}(l)$ is the momentary RSR parameter for the frame immediately preceding the frame under consideration at frequency sub-band under consideration, $\tau_A$ is the adaptation time constant, and $\tilde{\alpha}_n(l)$ is said RSR parameter for the frame under consideration at frequency sub-band under consideration.

16. The process of claim 15, wherein the process action of computing the adaptation time constant, comprises the actions of:

setting the adaptation time constant equal to a prescribed maximum value whenever, $\mu\sigma_R^2 T$ is greater than said maximum adaptation time constant value, wherein $\mu$ is an adjustment parameter designed to constrain the decay time constant to a desired deviation of the relative RSR $\sigma_R^2$;

setting the adaptation time constant equal to a prescribed minimum value whenever, $\mu\sigma_R^2 T$ is less than said minimum adaptation time constant value; and setting the adaptation time constant equal to $\mu\sigma_R^2 T$ whenever $\mu\sigma_R^2 T$ falls in a range from the minimum adaptation time constant value to the maximum adaptation time constant value.

17. The process of claim 16, wherein the desired deviation of the relative RSR for the frame under consideration $\sigma_{R_n}^2$ is defined as $$\sigma_{R_n}^2 = \left(1 - \frac{T}{2\tau_{AMAX}}\right)\sigma_{R_{n-1}}^2 + \frac{T}{2L\tau_{AMAX}} \sum_{l=0}^{L-1} \left( \frac{(\tilde{\alpha}_n(l) - \alpha_n(l))^2}{\alpha_n(l)^2} \right),$$

where $\tau_{AMAX}$ is the maximum adaptation time constant value, $\sigma_{R_{n-1}}^2$ is the desired deviation of the relative RSR for the frame immediately preceding the frame under consideration, L is the total number of said frequency sub-bands, l is the frequency sub-band under consideration, $\tilde{\alpha}_n(l)$ is said RSR parameter for the frame under consideration at frequency sub-band under consideration, and $\alpha_n(l)$ is the momentary reverberation-to-signal ratio of the frame under consideration for the frequency sub-band under consideration.

18. A computer-readable medium having computer-executable instructions for performing the process actions recited in claim 1.

19. A system for suppressing reverberation in a multi-channel audio stream, comprising:

a general purpose computing device; and a computer program comprising program modules executable by the computing device, wherein the computing device is directed by the program modules of the computer program to, estimate reverberation decay parameters for each of a prescribed number of frequency sub-bands for each audio channel of the multi-channel audio stream assuming a frequency dependent model of the reverberation decay, wherein the audio stream comprises a plurality of frames and said reverberation decay parameters comprise a decay time constant and a reverberation-to-signal ratio (RSR), and suppress the reverberation component of each frame of each channel of the audio stream that it is desired to dereverberate via a spectral subtraction-based reverberation reduction using the estimated reverberation decay parameters.

* * * * *